United States Patent
Childress et al.

(10) Patent No.: US 8,388,223 B2
(45) Date of Patent: Mar. 5, 2013

(54) FURNACE TEMPERATURE MONITORING DEVICE AND METHOD

(75) Inventors: Gary Childress, Westerville, OH (US); James Litzinger, Galena, OH (US); Thomas McInnerney, Pickerington, OH (US)

(73) Assignee: The Edward Orton Jr. Ceramic Foundation, Westerville, OH (US)

(*) Notice: Subject to any disclaimer, the term of this patent is extended or adjusted under 35 U.S.C. 154(b) by 273 days.

(21) Appl. No.: 11/891,226

(22) Filed: Aug. 9, 2007

(65) Prior Publication Data
US 2009/0041086 A1 Feb. 12, 2009

(51) Int. Cl.
  *G01K 3/14* (2006.01)
  *G01K 11/06* (2006.01)
  *G01K 11/14* (2006.01)

(52) U.S. Cl. ........ 374/137; 374/141; 374/112; 374/110; 374/160; 29/284

(58) Field of Classification Search .................. 374/1, 2, 374/10–12, 29–39, 43–45, 55, 100, 112, 374/113, 160, 161, 134, 137, 141, 187, 189, 374/204, E5.001, E5.003, 110; 419/10, 38; 116/216; 257/48, 257
See application file for complete search history.

(56) References Cited

U.S. PATENT DOCUMENTS

| | | | | |
|---|---|---|---|---|
| 4,242,907 A * | 1/1981 | Kazmierowicz | | 374/113 |
| 4,848,924 A * | 7/1989 | Nuspl et al. | | 374/119 |
| 5,857,777 A * | 1/1999 | Schuh | | 374/172 |
| 6,247,842 B1 * | 6/2001 | Kitch et al. | | 374/183 |
| 6,610,968 B1 * | 8/2003 | Shajii et al. | | 219/497 |
| 6,769,803 B1 * | 8/2004 | Feichtinger et al. | | 374/1 |
| 7,004,620 B2 * | 2/2006 | Simunovic et al. | | 374/102 |
| 7,380,982 B2 * | 6/2008 | Lohokare | | 374/137 |
| 7,470,058 B2 * | 12/2008 | Hutter et al. | | 374/43 |
| 7,534,028 B2 * | 5/2009 | Jussel et al. | | 374/1 |
| 2004/0247013 A1 * | 12/2004 | Clark et al. | | 374/1 |
| 2007/0201533 A1 * | 8/2007 | Takeuchi et al. | | 374/14 |
| 2008/0071494 A1 * | 3/2008 | Reading | | 702/130 |
| 2009/0052494 A1 * | 2/2009 | Wijffels | | 374/10 |

\* cited by examiner

*Primary Examiner* — Gail Verbitsky
(74) *Attorney, Agent, or Firm* — Mueller Smith & Okuley, LLC

(57) ABSTRACT

A method for measuring the temperature at various locations in a furnace adapted to heat-treat a metal part commences by placing one or more devices at various location within the furnace. Each device is an inorganic/metallic skeletal structure residual from firing a mixture of binder and one or more of inorganic or metallic particles at a temperature that chars the binder to form the inorganic/metallic skeletal structure of a determined shape. A physical parameter of the skeletal structure determined shape is monitored after firing of the furnace. Then, the monitored physical parameter is compared to a plot of temperature versus the physical parameter to determine the temperature of the furnace at the various locations.

6 Claims, 2 Drawing Sheets

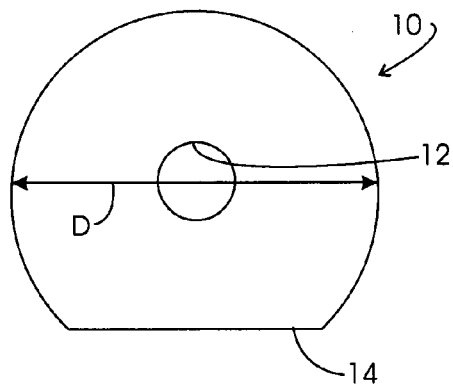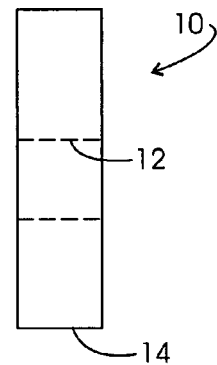
FIG. 1          FIG. 2
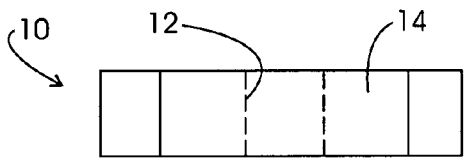
FIG. 3
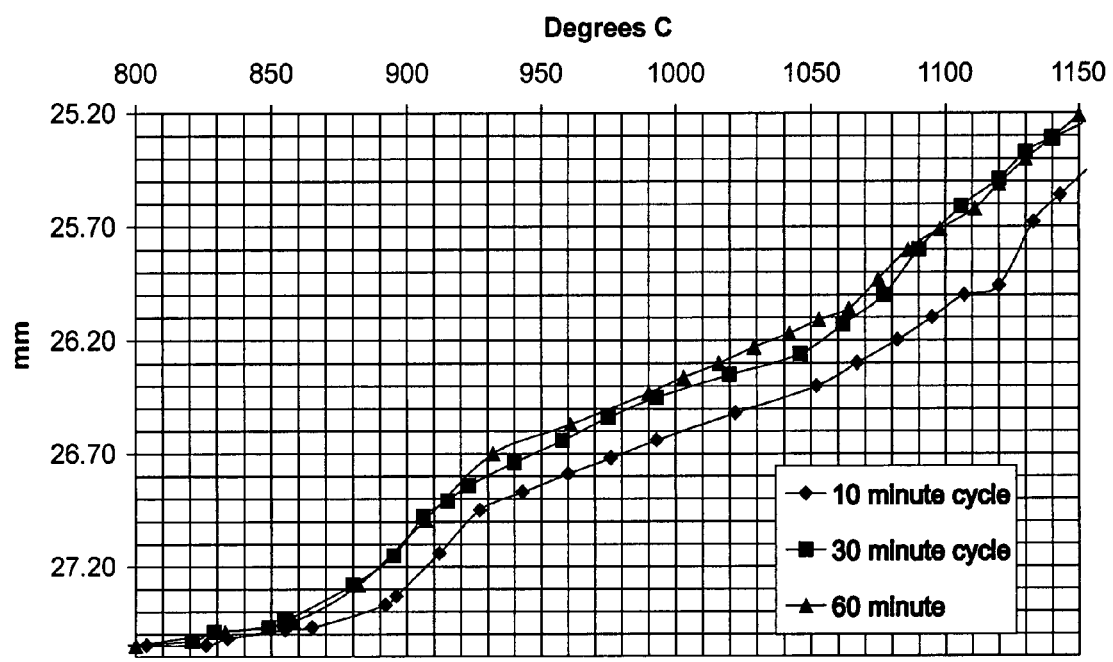
FIG. 4

FURNACE TEMPERATURE MONITORING DEVICE AND METHOD

CROSS-REFERENCE TO RELATED APPLICATIONS

None

STATEMENT REGARDING FEDERALLY SPONSORED RESEARCH

Not applicable.

BACKGROUND

The present disclosure generally relates to a system for measuring the uniformity of heat distribution within the heating chamber of a furnace during a heat treatment process, such as, for example, annealing, normalizing, hardening, tempering, and case hardening of ferrous alloys, brazing of metallic components, and the sintering of powder metal shapes in air, vacuum, and reducing atmospheres, typical heat treating atmospheres, having temperatures ranging from about 500° C. to about 1,300° C. More specifically, the disclosure concerns a device that measures the relative maximum temperature witnessed as determined by the shrinkage of the device per a prepared calibration table without contaminating the furnace atmosphere.

Current practice for the metal heat-treating industry to determine the uniformity of heat distribution during a heat treatment process is to utilize thermocouples placed at specific sites throughout the heating chamber to conduct a temperature uniformity survey. These thermocouples, then, have to be connected to a sensing/recording device to measure the temperature at each specific site. The sensing/recording device can be external or internal to the heating chamber, but in either case the process is cumbersome and can actually distort the heat-treating process due to the added weight of the internal sensor/recorder. The measurement of the heat distribution uniformity is a requirement to insure that all the parts being treated received the correct level of heat to assure the heat treatment process was effective.

BRIEF SUMMARY

One aspect of the disclosure is a method for measuring the temperature at various locations in a furnace adapted to heat-treat a metal part commences by placing one or more devices at various locations within the furnace. Each device is an inorganic/metallic skeletal structure residual from firing a mixture of binder and one or more of inorganic or metallic particles at a temperature that chars the binder to form the inorganic/metallic skeletal structure of a determined shape. A physical parameter of the skeletal structure determined shape is monitored during firing of the furnace. Then, the monitored physical parameter is compared to a plot of temperature versus the physical parameter to determine the maximum temperature reached in the furnace at the various locations.

Another aspect of the disclosure is a method for making a device for measuring the temperature at various locations in a furnace adapted to heat-treat a metal part, which commences with forming a shaped piece from a mixture of binder and one or more of inorganic or metallic particles. The piece is fired at a temperature that chars the binder to form the device of an inorganic/metallic skeletal structure of a determined shape. The piece then is fired at various metal treating temperatures and a physical parameter of the skeletal structure measured for generating a plot of temperature versus the physical parameter. In this way, the device can be placed in metal treating furnaces at various locations and the physical parameter monitored and compared to the plot to determine the furnace temperature at the various locations.

A further aspect of the disclosure is a combination for determining the temperature at various locations in a furnace adapted to heat-treat a metal part. Such combination includes a device of an inorganic/metallic skeletal structure residual from firing a mixture of binder and one or more of inorganic or metallic particles at a temperature that chars the binder to form the inorganic/metallic skeletal structure of a determined shape. The combination also includes a plot of temperature versus the physical parameter of the device. In this way, the device can be placed in metal treating furnaces at various locations and the physical parameter monitored and compared to the plot to determine the furnace temperature at the various locations.

The present device and process simplifies the heat distribution uniformity survey within the heating chamber of a furnace without disrupting the production schedule of the heat-treating process and without adding contaminants to the furnace atmosphere. Since each device is independent and does not require connection to a sensor/recorder, there are no wires or internal sensor/recorder. These and other advantages will be apparent to those skilled in the art based on the present disclosure.

BRIEF DESCRIPTION OF THE DRAWINGS

For a fuller understanding of the nature and advantages of the present device and process, reference should be had to the following detailed description taken in connection with the accompanying drawings, in which:

FIG. 1 is a simplified drawing of the device tested in the Examples;

FIG. 2 is a calibration plot of the length of the device versus furnace temperature of the device tested in the Examples;

FIG. 3 is a batch specific calibration plot of the length of the device versus furnace temperature of the device tested in the Examples; and FIGS. 4 and 5 graphically plot soak temperature versus measured diameter of the test pieces, as such data is recorded in Tables 4 and 5, respectively, in the Example.

Figure 5:
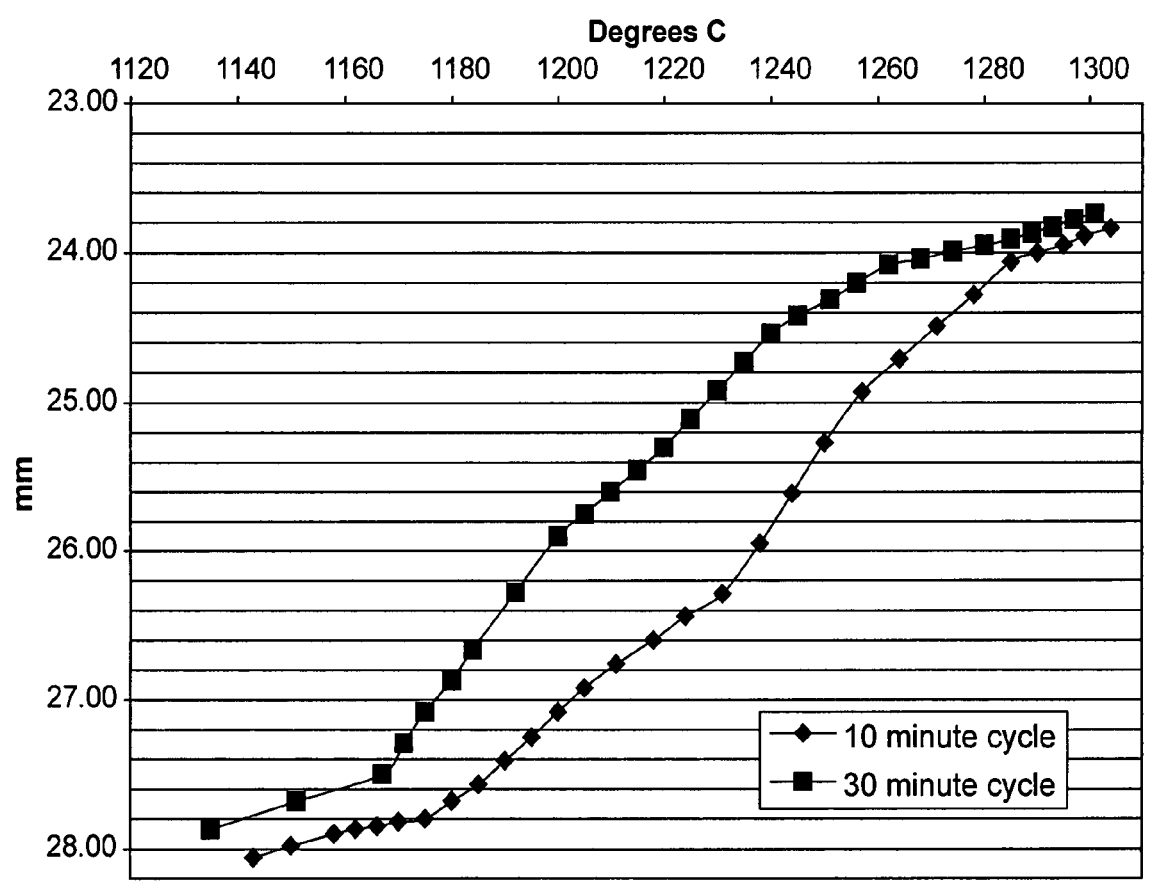

The drawings will be more fully described in the Examples.

DETAILED DESCRIPTION

Ingredients:

The disclosure proposes to use thin, pressed round or oblong devices prepared from inorganic and/or metallic particles in a binder and/or binder/plasticizer mixture which has been fired to burn the mixture and leave a porous inorganic, metallic, or inorganic/metallic skeletal structure device. A hole may also be formed in the device before or after firing. The device can be calibrated by subjecting it to specific temperatures and measuring its length. A curve can be plotted of temperature versus length (or width, etc.). As temperatures increase, the device continues to shrink. By placing these devices in a furnace during treating of a metal workpiece, say, for example at the 4 corners, the operator can measure the devices after heat-treating to determine the maximum temperature that the device saw in the furnace at each location.

The disclosed device can be manufactured from a selection of materials and formulated to shrink in relation to varying levels of heat exposure. Measurement of the disclosed device after being exposed in the heat-treating process can be accomplished with a typical micrometer across the recommended dimension(s). Once the dimension is determined and related to the calibration chart specific for the batch number the maximum relative temperature witnessed by the device can be determined.

A typical formulation for the device is set forth below:

TABLE 1

| Ingredient | Weight Percent |
|---|---|
| Calcined kaolin | 40-88 |
| Ball clay | 20-40 |
| Kaolin | 20-40 |
| Frit | 12-50 |
| Cellulose binder | 1-2 |
| Lubricating agent | 0.2-0.5 |

Manufacturing Process:

Raw materials are weighed according to batch specifications and introduced into an Eirich mixer. Once the dry ingredients are blended, water is added to a range of about 6% to about 8% by weight and the mixer is allowed to produce a mix consisting of small agglomerates of the now damp powder. Once the powder is allowed to reach a homogenous state, the powder is pressed into modified disks in dies on a hydraulic press per FIG. 1. The pressed pieces are dried and then pre-calcined in an electric fired kiln heated to about 600° C. to about 700° C. at a heat-up rate of about 100° C. per hour and a one hour hold at peak temperature. The pre-calcining process removes all organic material and the chemically bound water from the device.

Application:

The device can be utilized in either periodic or continuous furnaces. Utilization of the disclosed method is accomplished by placing the device in various locations through out the furnace prior to the beginning of the heat-treating process. The hole provided in the center of the device allows for binding the device in place using refractory wire or hanging the device from a pin or loop of refractory wire so as to locate the device in the desired position. Once the heat-treating process is completed, the devices are retrieved, noting location of each device, and measured in millimeters to, for example, two (2) decimal places using a precision micrometer. The measurement of the device should be taken between the two (2) points of greatest separation on a line parallel to the flat side of the device. Utilizing the proper table the measurement can be converted to the Tab Temperature. The amount of variation determined between the devices within the furnace locations relate directly to the amount of variation in heat distribution within the furnace.

The disclosed device and method work in virtually any furnace atmosphere, including, but not limited to, for example:

1. Vacuum: typically operating at $1\times10^{-3}$ to $1\times10^{-5}$ mm Hg.
2. Hydrogen (100%): dew point range of –100° F. to 0° F.
3. Hydrogen-Nitrogen Mixture: most commonly by volume 75/25, 60/40, 10/90, 3/97; dew point range of –100° F. to 0° F.
4. Dissociated Ammonia: 75% hydrogen, 25% ammonia by volume, 2500 ppm Ammonia; dew point –60° F.
5. Endothermic Gas: 40% nitrogen, 37% hydrogen, 20% carbon monoxide, 1.5% carbon dioxide, 0.5% methane; dew point range of –10° F. to +70° F.
6. Lean Exothermic Gas: 87% nitrogen, 1.2% hydrogen, 1.5% carbon monoxide, 10.5% carbon dioxide; dew point range of –40° F. to +110° F.
7. Rich Exothermic Gas: 72% nitrogen, 12.5% hydrogen, 10.5% carbon monoxide, 5% carbon dioxide; dew point range of –40° F. to +110° F.
8. Nitrogen: 100%; dew point of –100° F.
9. Argon: 100%; dew point of –60° F.

EXAMPLE

Referring to FIG. 1, a disclosed device is illustrated. The device, 10, is based on a 9/16" radius circle having a 1/4" hole, 12, located at the center, and a flat, 14, on one side located about 15/32" from the center of device 10 and a 15/16" distance from flat 14 through dead center to the opposite side. Device 10 has a thickness of about 1/4".

Two formulations of the device, TempTab™ 300 and TempTab™ 600, were formulated from the ingredients set forth in Table 2 below:

TABLE 2

| Ingredient* | TempTab 300 (wt-%) | TempTab 600 (wt-%) |
|---|---|---|
| Kaolin Clay #6 | — | 20 |
| Ball Clay | — | 20 |
| Calcined Kaolin | — | 60 |
| Kaolin (Barden) | 88 | — |
| Frit #6 | 12 | — |
| Cellulose Binder | 1 | 1 |
| Lubricating Agent | 0.3 | 0.3 |

*Frit #6 is an insoluble glass powder containing aluminum oxide, silicon dioxide, borax, calcium carbonate, barium carbonate and other minor ingredients. Cellulose Binder is a water-soluble methylcellulose polymer, Methocel. Lubricating Agent is hydrogenated cottonseed oil, Sterotex NFCORD.

Each of the formulations was formed into a device having the configuration and dimensions of the device in FIG. 1, fired at 600° C. for 60 minutes in order to burn off the carbonaceous material and leave a skeletal structure weighing 4.5±0.1 gms. Each test sample device, then, was placed in a furnace and subjected to a soak over a temperature range and for a time, as detailed in tables, below. The distance across the diameter (horizontal dimension, D, in FIG. 1) was measured at each temperature and recorded. The results recorded are displayed in Tables 3 and 4, below, and also are displayed in FIGS. 4 and 5.

TABLE 3

TempTab 300

| 10 minute cycle | | 30 minute cycle | | 60 minute cycle | |
|---|---|---|---|---|---|
| Temp (° C.) | D (mm) | Temp (° C.) | D (mm) | Temp (° C.) | D (mm) |
| 1153 | 25.45 | 1151 | 25.25 | 1150 | 25.21 |
| 1143 | 25.56 | 1140 | 25.31 | 1140 | 25.31 |
| 1133 | 25.68 | 1130 | 25.37 | 1130 | 25.40 |
| 1120 | 25.96 | 1120 | 25.49 | 1120 | 25.51 |
| 1107 | 26.00 | 1106 | 25.61 | 1111 | 25.62 |
| 1095 | 26.10 | 1090 | 25.80 | 1098 | 25.71 |
| 1082 | 26.20 | 1077 | 26.00 | 1086 | 25.80 |
| 1067 | 26.30 | 1062 | 26.13 | 1075 | 25.93 |
| 1052 | 26.40 | 1046 | 26.26 | 1064 | 26.06 |
| 1022 | 26.52 | 1020 | 26.35 | 1053 | 26.11 |
| 993 | 26.64 | 993 | 26.45 | 1042 | 26.17 |
| 976 | 26.72 | 975 | 26.54 | 1029 | 26.23 |
| 960 | 26.79 | 958 | 26.64 | 1016 | 26.30 |
| 943 | 26.87 | 940 | 26.74 | 1003 | 26.36 |
| 927 | 26.95 | 923 | 26.84 | 990 | 26.43 |
| 912 | 27.14 | 915 | 26.91 | 961 | 26.57 |
| 896 | 27.33 | 906 | 26.98 | 932 | 26.70 |
| 892 | 27.37 | 895 | 27.15 | 907 | 26.99 |
| 865 | 27.47 | 880 | 27.28 | 882 | 27.28 |

TABLE 3-continued

TempTab 300

| 10 minute cycle | | 30 minute cycle | | 60 minute cycle | |
|---|---|---|---|---|---|
| Temp (° C.) | D (mm) | Temp (° C.) | D (mm) | Temp (° C.) | D (mm) |
| 855 | 27.48 | 855 | 27.44 | 858 | 27.44 |
| 834 | 27.52 | 849 | 27.47 | 833 | 27.49 |
| 826 | 27.55 | 829 | 27.49 | 800 | 27.55 |
| 804 | 27.55 | 821 | 27.53 | | |
| | | 794 | 27.55 | | |

TABLE 4

TempTab 600

| 10 minute cycle | | 30 minute cycle | | 60 minute cycle | |
|---|---|---|---|---|---|
| Temp (° C.) | D (mm) | Temp (° C.) | D (mm) | Temp (° C.) | D (mm) |
| 1304 | 23.84 | 1301 | 23.74 | 1301 | 23.74 |
| 1299 | 23.89 | 1297 | 23.78 | 1297 | 23.78 |
| 1295 | 23.95 | 1293 | 23.83 | 1293 | 23.83 |
| 1290 | 24.00 | 1289 | 23.87 | 1289 | 23.87 |
| 1285 | 24.06 | 1285 | 23.91 | 1285 | 23.91 |
| 1278 | 24.28 | 1280 | 23.95 | 1280 | 23.95 |
| 1271 | 24.49 | 1274 | 23.99 | 1274 | 23.99 |
| 1264 | 24.71 | 1268 | 24.04 | 1268 | 24.04 |
| 1257 | 24.93 | 1262 | 24.08 | 1262 | 24.08 |
| 1250 | 25.27 | 1256 | 24.20 | 1256 | 24.20 |
| 1244 | 25.61 | 1251 | 24.31 | 1251 | 24.31 |
| 1238 | 25.95 | 1245 | 24.42 | 1245 | 24.42 |
| 1231 | 26.29 | 1240 | 24.54 | 1240 | 24.54 |
| 1224 | 26.44 | 1235 | 24.73 | 1235 | 24.73 |
| 1218 | 26.60 | 1230 | 24.92 | 1230 | 24.92 |
| 1211 | 26.76 | 1225 | 25.11 | 1225 | 25.11 |
| 1205 | 26.92 | 1220 | 25.30 | 1220 | 25.30 |
| 1200 | 27.08 | 1215 | 25.45 | 1215 | 25.45 |
| 1195 | 27.25 | 1210 | 25.60 | 1210 | 25.60 |
| 1190 | 27.41 | 1205 | 25.75 | 1205 | 25.75 |
| 1185 | 27.57 | 1200 | 25.90 | 1200 | 25.90 |
| 1180 | 27.68 | 1192 | 26.28 | 1192 | 26.28 |
| 1175 | 27.80 | 1184 | 26.66 | 1184 | 26.66 |
| 1170 | 27.82 | 1180 | 26.87 | 1180 | 26.87 |
| 1166 | 27.85 | 1175 | 27.08 | 1175 | 27.08 |
| 1162 | 27.87 | 1171 | 27.29 | 1171 | 27.29 |
| 1158 | 27.90 | 1167 | 27.50 | 1167 | 27.50 |
| 1150 | 27.98 | 1151 | 27.68 | 1151 | 27.68 |
| 1143 | 28.06 | 1135 | 27.87 | 1135 | 27.87 |

Based on this test data, devices from this particular batch can be utilized in the heat treatment process, then measured and the measurements compared to the Table or Chart to determine the maximum temperature experienced by the device during the heat treatment process; thus, providing the heat distribution profile within the furnace.

While the (device)(process)(apparatus) has been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. A method for making a device for measuring the temperature at various locations in a metal treating furnace that heat-treats a metal part, which comprises the steps of:
   (a) forming a shaped piece from a mixture of binder and one or more of inorganic or metallic particles;
   (b) firing said piece at a temperature that chars said binder to form said device of an inorganic, metallic, or inorganic-metallic skeletal structure of a determined shape; and
   (c) firing said piece at various metal treating temperatures and measuring a physical parameter of said skeletal structure for generating a plot of temperature versus said physical parameter,
said device, when placed in said metal treating furnace at various locations and said physical parameter monitored and compared to said plot, determines the furnace temperature at said various locations.

2. The method of claim 1, wherein said measured physical parameter comprises measuring a length of said skeletal structure.

3. The method of claim 1, wherein said mixture of binder and one or more of inorganic or metallic particles comprises between about 40% and 88% calcined kaolin, between about 20% and 40% ball clay, between about 20% and 40% kaolin, between about 12% and 50% of a frit, between about 1% and 2% of a cellulose binder, and between about 0.2% and 0.5% of a lubricating agent, all percentages by weight.

4. The method of claim 3, wherein said mixture of binder and one or more of inorganic or metallic particles comprises about 20% kaolin clay, about 20% ball clay, about 60% kaolin, about 1% cellulose binder, and about 0.3% lubricating agent; or about 88% kaolin, about 12% frit, about 1% cellulose binder, and about 0.3% lubricating agent.

5. The method of claim 1, wherein said mixture of binder and one or more of inorganic or metallic particles is heated to between about 600° and 700° C. to form said skeletal structure.

6. The method of claim 2, wherein said skeletal is formed into a circular disk shape and said monitored physical parameter comprises measuring the diameter.

* * * * *